United States Patent
Barrall

(10) Patent No.: US 9,568,102 B2
(45) Date of Patent: Feb. 14, 2017

(54) PRESS-IN PLACE GASKETS AND FABRICATION METHODS

(71) Applicant: Interface Solutions, Inc., Lancaster, PA (US)

(72) Inventor: Jeffery Barrall, Lititz, PA (US)

(73) Assignee: Interface Performance Materials, Inc., Lancaster, PA (US)

( * ) Notice: Subject to any disclaimer, the term of this patent is extended or adjusted under 35 U.S.C. 154(b) by 53 days.

(21) Appl. No.: 14/083,565

(22) Filed: Nov. 19, 2013

(65) Prior Publication Data

US 2014/0138919 A1    May 22, 2014

Related U.S. Application Data

(60) Provisional application No. 61/727,759, filed on Nov. 19, 2012.

(51) Int. Cl.
| | |
|---|---|
| *F16J 15/32* | (2006.01) |
| *F16J 15/02* | (2006.01) |
| *B29D 99/00* | (2010.01) |
| *F16J 15/12* | (2006.01) |

(52) U.S. Cl.
CPC ............ *F16J 15/02* (2013.01); *B29D 99/0053* (2013.01); *F16J 15/121* (2013.01); *Y10T 156/1002* (2015.01)

(58) Field of Classification Search
CPC .......... F16J 15/10; F16J 15/104; F16J 15/108; F16J 15/12; F16J 15/121
See application file for complete search history.

(56) References Cited

U.S. PATENT DOCUMENTS

| | | | |
|---|---|---|---|
| 914,422 A | 3/1909 | Jones | |
| 2,459,721 A | 1/1949 | Poltorak | |
| 2,880,019 A | 3/1959 | Wurtz et al. | |
| 3,124,502 A * | 3/1964 | Radke | 428/66.4 |
| 3,660,192 A * | 5/1972 | Smith et al. | 156/155 |
| 3,949,591 A | 4/1976 | Gregoire | |
| 4,174,990 A | 11/1979 | Meister | |
| 4,300,379 A | 11/1981 | Johnson et al. | |
| 4,926,600 A | 5/1990 | Mesnel | |
| 5,022,663 A | 6/1991 | Fages et al. | |

(Continued)

FOREIGN PATENT DOCUMENTS

JP    2026367    1/1990

*Primary Examiner* — Gilbert Lee
(74) *Attorney, Agent, or Firm* — Womble Carlyle Sandridge & Rice LLP

(57) ABSTRACT

Gasket stock is disclosed having a rectangular metal core that is readily bendable in one direction and a deformable rubberized jacket coextruded with and encasing the metal core. A method of fabricating the gasket stock through a coextrusion process is disclosed. A method also is disclosed for forming a press-in-place gasket with the method including obtaining bendable gasket stock, incrementally advancing the gasket stock to predetermined positions in a bender, and bending the gasket stock at the predetermined positions along its length to form a desired shape of the press-in-place gasket. The bender is controlled by a computer to form the shape of the gasket according to a CAD or other electronic file. Finally, a method of supplying press-in-place gaskets and accommodating design changes of such gaskets is disclosed.

25 Claims, 3 Drawing Sheets

(56) References Cited

U.S. PATENT DOCUMENTS

| | | | |
|---|---|---|---|
| 5,082,297 | A | 1/1992 | Flasher |
| 5,121,951 | A | 6/1992 | Harbom et al. |
| 5,492,336 | A | 2/1996 | Barna et al. |
| 5,536,018 | A | 7/1996 | Szott |
| 5,551,706 | A | 9/1996 | Barna et al. |
| 5,653,450 | A | 8/1997 | De Villepoix et al. |
| 6,446,979 | B1 | 9/2002 | Steinetz et al. |
| 6,942,827 | B2 | 9/2005 | Gernand et al. |
| 7,806,413 | B2 | 10/2010 | Hurlbert et al. |
| 7,867,422 | B2 | 1/2011 | Nelson et al. |
| 2002/0130434 | A1 | 9/2002 | Rigali et al. |
| 2004/0232624 | A1* | 11/2004 | Hisano et al. ............... 277/500 |
| 2006/0220324 | A1 | 10/2006 | Anderson et al. |
| 2006/0247949 | A1 | 11/2006 | Shorrosh |
| 2008/0001366 | A1* | 1/2008 | Gladfelter ................ 277/575 |
| 2011/0133366 | A1 | 6/2011 | Lim et al. |

\* cited by examiner

PRESS-IN PLACE GASKETS AND FABRICATION METHODS

RELATED APPLICATIONS

This application claims the benefit of U.S. Provisional Patent Application No. 61/727,759, filed on 19 Nov. 2012, and entitled "Press-in-place Gaskets and Fabrication Methods", which application is incorporated by reference in its entirety herein.

TECHNICAL FIELD

This disclosure relates generally to gaskets for creating a seal between a pair of facing mating surfaces and more particularly to so-called press-in-place or spaghetti gaskets configured to be pressed into a groove formed in one or more of the mating surfaces.

BACKGROUND

Press-in-place gaskets are well known for sealing between a pair of flanges that are secured together in face-to-face relationship with bolts or the like. Such gaskets, sometimes referred to as spaghetti gaskets, generally are relatively thin bands of rubber or similar material that are injection molded to have a shape corresponding to that of a groove formed in the surface of one (or both) of the flanges to be sealed. The press-in-place gasket, as its name implies, is pressed into the groove before the flanges are joined and bolted together. A cross-sectional profile of the gasket may be configured to hold the gasket in place within the groove and to control the compression of the gasket as the flange and its mating flange are bolted together, whereupon the gasket forms a seal between the mating surfaces. Some press-in-place gaskets are made with a metal core to, among other things; help the gaskets hold their shape before and during installation. These metal core gaskets generally are fabricated in an injection mold wherein a metal core in the shape of the gasket is placed in the injection mold. The rubberized gasket material is then injection molded around the metal to form the gasket.

Prior press-in-place gaskets, and methods of making them, have exhibited inherent problems and shortcomings. For example, the cost of an injection mold for molding press-in-place gaskets can be exceedingly expensive and generally requires weeks of time for its production. This also means that there can be no substantive changes in the shape or configuration of the gasket once the mold maker begins the task of making the mold. Further, a modification in the gasket before or after the mold is finished usually requires that a new mold be created, taking time and consuming substantial financial resources. It often is useful for a designer of power train components to have access to prototypes of gaskets to be used in power train components in order to test and refine the components and surfaces to be sealed. Unfortunately, it is problematic to provide prototypes of press-in-place gaskets since the injection molding process by which they are made is expensive, slow, and does not lend itself readily to rapid prototyping techniques.

A need exists for a press-in-place gasket and a method of making press-in-place gaskets that addresses these and other problems of the prior art. It is to the provision of such a gasket and method that this disclosure is primarily directed.

SUMMARY

Briefly described, a method of fabricating press-in-place gaskets includes extruding a rubberized gasket material around a central core made of a malleable material such as aluminum to form a continuous elongated strand of gasket stock. The gasket stock has a predetermined outer profile and may be wound onto storage reels for storage and/or shipment. The method further includes incrementally moving the gasket stock through a computer controlled bender having heads that bend the gasket stock into a desired programmed shape corresponding to the shape of a groove in a flange. When the bending is complete the strand is cut and the resulting free ends may be bonded together to form a continuous closed press-in-place gasket. Press-in-place gaskets having unique characteristics according to the invention and press-in-place gaskets formed by the unique method of the invention are also within the scope of the invention. Once fabricated, the press-in-place gaskets can be used in a manner similar to traditional injection molded press-in-place gaskets by pressing them into a groove formed in a mating surface and clamping the corresponding mating surface to the first mating surface.

The method of the invention eliminates the requirement to form an injection mold in which to mold press-in-place gaskets. Further, a press-in-place gasket of virtually any shape can be fabricated in an exceedingly short time since the shape of the gasket is determined in a digital profile such as a CAD or other electronic file. Significant also is the fact that changes can be made to a gasket design at any time in the process, and those changes can be implemented simply by revising the digital profile in the computer and "bend forming" the new gasket. Prototypes having perhaps various different shapes can be delivered in short order to power train component designers for research and development purposes and for a fraction of the cost of traditional injection molded press-in-place gaskets. Accordingly, press-in-place gaskets and methods of fabricating them are now provided that address the problems above and provide other benefits and advantages not possible with traditional injection molding techniques. These and other aspects, features, and advantages will be better appreciated upon review of the detailed description set forth below taken in conjunction with the accompanying drawing figures, which are briefly described as follows.

DETAILED DESCRIPTION

Figure 1:
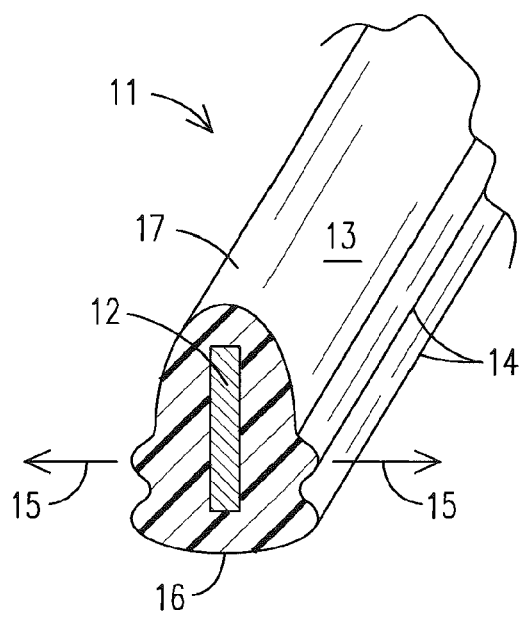
FIG. 1 is a perspective partially sectioned view of a press-in-place gasket that embodies principles of the invention in one preferred form.

Referring now in more detail to the drawing figures, wherein like reference numerals indicate like parts throughout the several views, FIG. 1 illustrates a length of press-in-place gasket stock that embodies principles of the invention on one preferred form. The gasket stock 11 comprises a core 12 that is made of a malleable or bendable material that holds its shape when bent. In the preferred embodiment, the material of the core can be aluminum; however, other materials such as mild steel, copper, other metals, or non-metals such as polymers and composites may be used so long as the core can be bent and retains its bent shape after bending. The core 12 in the illustrated embodiment has a rectangular cross sectional profile so that it is readily bendable in a direction transverse to the long dimension of the core but resists bending in a direction transverse to the short dimension of the core. In FIG. 1, for instance, the core is readily bendable in the direction indicated by arrows 15. It also is possible that the core be substantially square in cross section so that it is bendable along two orthogonal axes perpendicular to adjacent sides but resists bending in directions between these. Indeed, the core can be shaped to bend readily in more than two directions if desired for a particular gasket. In this way, press-in-place gaskets configurations in more than one plane can be formed. All such configurations are within the scope of the invention even though the exemplary embodiment is readily bendable in only one direction.

The core is encased in a jacket 13 made of gasket material. The gasket material may be any compressible material suitable for use as a press-in-place gasket including, without limitation, a thermoset rubber, a polymer, an acrylic, a polyacrylic, an elastomer, a composite, or combinations thereof. As detailed below, the jacket 13 is extruded around the core 12 and is formed to exhibit an exterior profile of a desired shape. In the embodiment of FIG. 1, for instance, the profile has a base 16, side ribs 14, and a top portion 17. When pressed into a groove of a mating surface, the side ribs may compress against the walls of the groove to hold the gasket in place in the groove as the mating flange is secured against the mating surface. The gasket also may be formed with any other suitable exterior profile. For example, in FIG. 1a, a gasket 21 has a core 22 embedded within a jacket 23. The jacket 23 is extruded to have an exterior profile with a bottom protrusion 26, a top protrusion 27 formed of a pair of upwardly projecting ribs 28, and side ribs 24. In this embodiment, the side ribs 24 help hold the gasket in a groove while the bottom protrusion 26 and the upwardly projecting ribs bear against mating surfaces to form a seal. These and many other profiles of the gasket are possible depending upon application specific requirements, and all such profiles are intended to be within the scope of the invention.

Figure 2:
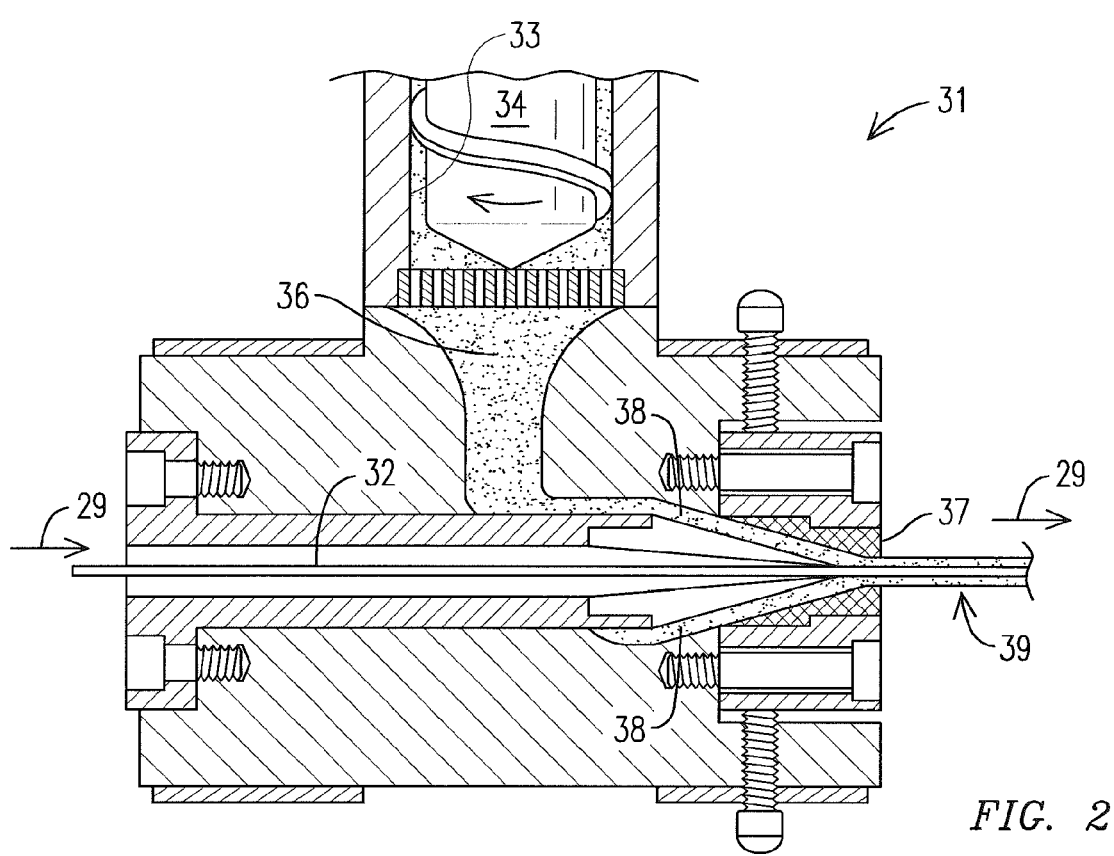
FIG. 2 is a cross-sectional view of a cross-head injection molding apparatus configured to extrude press-in-place gasket stock according to methods of the invention.

FIG. 2 illustrates a preferred methodology for forming press-in-place gasket stock according to an aspect of the invention. The gasket may be formed using a traditional cross-head extruder 31. Such extruders are generally understood by the skilled artisan, and so need not be described in detail here. In general, however, the extruder 31 has a central opening through which a length of core material 32 is moved in the direction of arrow 29. Jacket material, which may be a thermoset material, is fed, usually in strips, from a hopper (not shown) through the barrel 33 of an extruder by a screw 34. In the process, the jacket material is heated until it becomes flowable. The jacket material is forced by the extrusion screw 34 through channels 38 in the extruder and through aligned channels in an extruder die 37 until it intersects with and encases the moving core 32. In this regard, the rate of movement of the core 32 is controlled to correspond to the rate at which the jacket material moves through the die to minimize shear and promote good bonding between the jacket material and the material of the core.

Figure 1A:
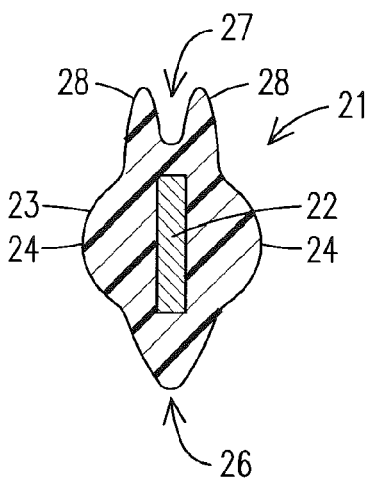
FIG. 1a is a cross sectional view of a press-in-place gasket having an alternate exterior profile according to an aspect of the invention.

The die is formed to shape the jacket material with a desired exterior profile, such as those shown in FIGS. 1 and 1a for example, to form the metal core gasket stock of the invention. As the gasket stock leaves the die, it can be cooled by known methods to cure the thermoset jacket material. Alternatively, the gasket stock can be passed through a temperature controlled bath of hot salt water or other liquid so that the jacket material is not completely set or cured at this stage. With this alternative, gaskets later formed from the gasket stock as described below can be cured by annealing or otherwise after they are formed. In either event, the resulting gasket stock may be wound onto a bulk reel for storage and transport.

Figure 3:
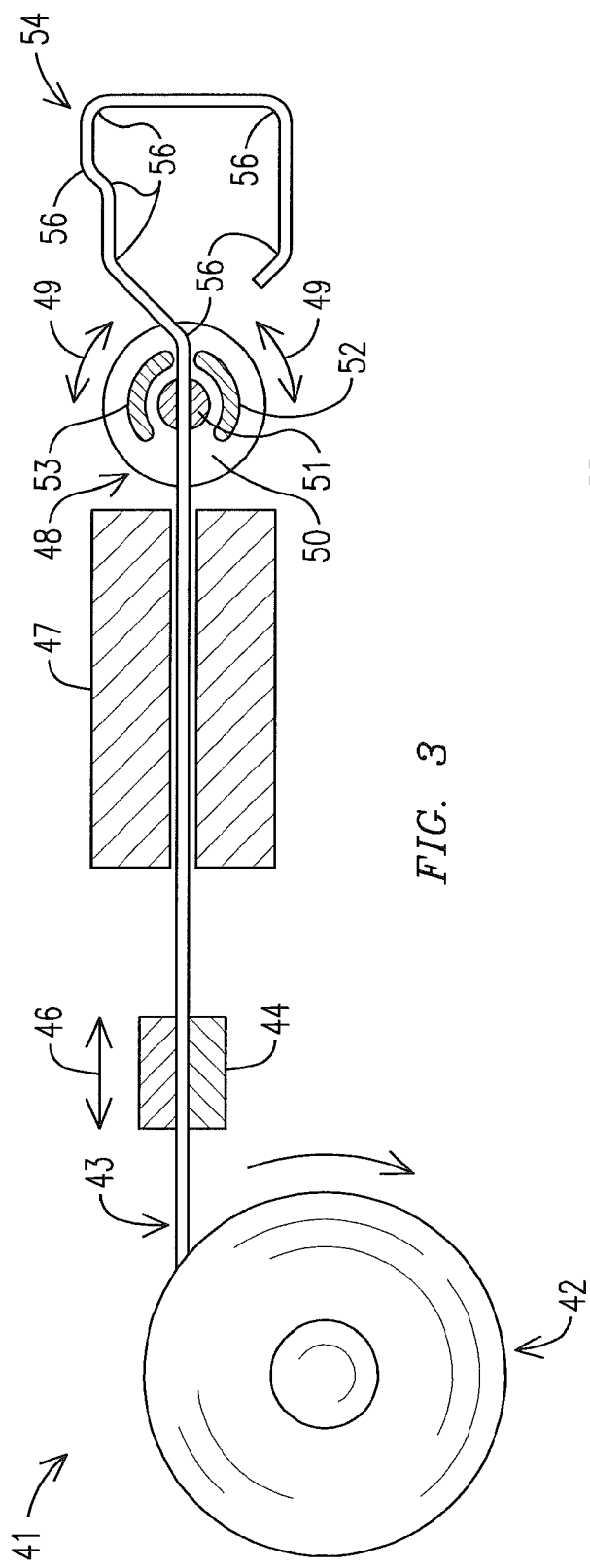
FIG. 3 is a simplified schematic of a bending apparatus forming a press-in-place gasket from the extruded stock according to principles of the invention.

FIG. 3 is a simplified schematic of an apparatus for forming press-in-place gaskets from gasket stock according to the methodology of the invention. The apparatus 41 is fed with gasket stock 43 as described above from a reel 42 or other bulk store from which gasket stock can be drawn. The stock 43 extends through a vice 44 that can be computer controlled to grip and release the gasket stock and, when gripping it, to move predetermined distances in a back and/or forth direction as indicated by arrow 46. In this way, the gasket stock 43 can be controllably fed from the reel 42 through the apparatus in predetermined increments of predetermined sizes. The gasket stock 43 is fed by the vice through an alignment block 47, which holds the stock straight as it is fed downstream to the right in FIG. 3. Straightening rollers also may be incorporated in the alignment block or elsewhere to straighten the gasket stock 43 as it is drawn from the spiral reel.

Figure 4:
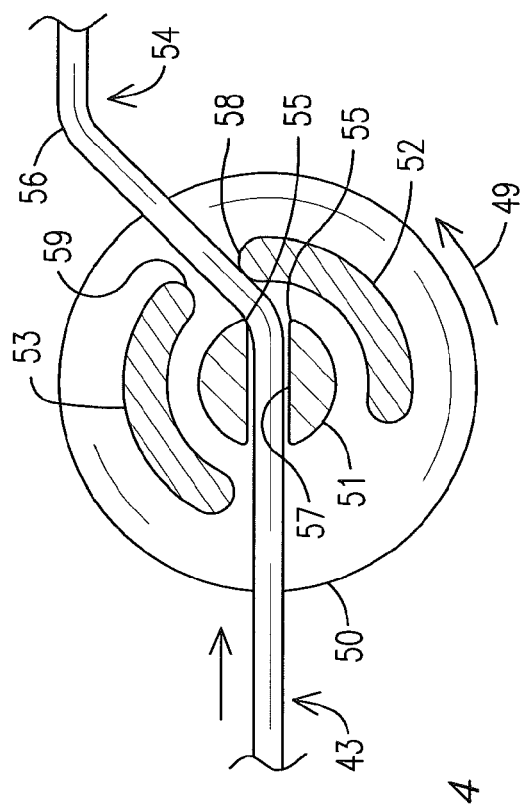
FIG. 4 is an enlarged view of a computer controlled bender head of the bender illustrating control of the head to bend the press-in-place gasket stock to form a press-in-place gasket of a desired shape.

A bending head 48 is disposed just downstream of the alignment block 47 and the gasket stock 43 extends from the alignment block through the bending head 48. With reference to FIG. 4, the bending head in the illustrated embodiment comprises a rotatable platter 50 to which is attached a pair of arcuate bending dogs 52 and 53. The bending dog 52 has an end 58 and the bending dog 53 has an end 59. The platter 50 is controllably rotatable in the directions indicated by arrows 49 and the rotation of the platter is controlled by the computer or other controller that controls the vice 44. A cylindrical anvil 51 is axially aligned with and is stationary with respect to the platter 50. A slot 57 extends through the anvil 51 and each wall of the slot terminates in a downstream edge 55. The slot 57 is sized to receive gasket stock 43 in such a way that the gasket stock is snug within the slot 57 but nevertheless moveable therethrough as the closed vice 44 advances the gasket stock incrementally as indicated at 46.

Referring to FIG. 4, as the platter 50 and its bending dogs rotate in, for example, a counterclockwise direction indicated in 49 with a length of gasket stock 43 projecting from the slot 57 of the anvil 51, the end 58 of bending dog 52 engages the gasket stock. As the platter 50 rotates further, the bending dog 52 causes the gasket stock to bend at the edge 55 of the slot 57. The rectangular metal core of the gasket stock is oriented transverse to the direction of the bend. Thus, bending of the gasket stock in the direction shown in FIG. 4 (and the opposite direction as in bend 56) occurs readily and the resulting bend keeps its shape after the bending. The platter 50 and its bending dogs 52 and 53 are controllably rotatable in either direction and through any degree of arc so that a bend in the gasket stock of virtually any angle can be accomplished.

To fabricate a press-in-place gasket of desired configuration, the desired finished shape of the gasket is established in a CAD or other electronic file. This file is received into the computer that is programmed to control the apparatus 41 and the computer carries out its program instructions to form the gasket according to the specification in the electronic file. More specifically, the computer controls the vice 44 to grip the gasket stock 43 and to move the stock in the downstream direction until the location of a desired bend in the stock aligns with the edges 55 of the anvil 51. With the gasket stock so located, the computer then controls the platter 50 and thus the bending dogs 52 and 53 to rotate in the direction of the desired bend in the gasket stock. As the end of a bending dog engages the gasket stock, it begins to bend the gasket stock as shown in FIG. 4. The computer rotates the platter through the appropriate arc to form a bend in the gasket stock having the angle specified in the electronic file. The bend may be slight or may be ninety degrees or more as required to conform to a flange slot into which the finished gasket is to be pressed.

The vice is then controlled to move the gasket stock to the incremental location of the next desired bend and the platter and bending dogs form the next bend in a similar manner. It will thus be seen that a press-in-place gasket 54 is progressively formed having multiple bends that define a shape that corresponds to that specified in the CAD or electronic file. This is exemplified in FIG. 3, for instance, where the press-in-place gasket 54 is seen taking shape with bends 56 of various angles having been created at the proper locations.

Figure 5:
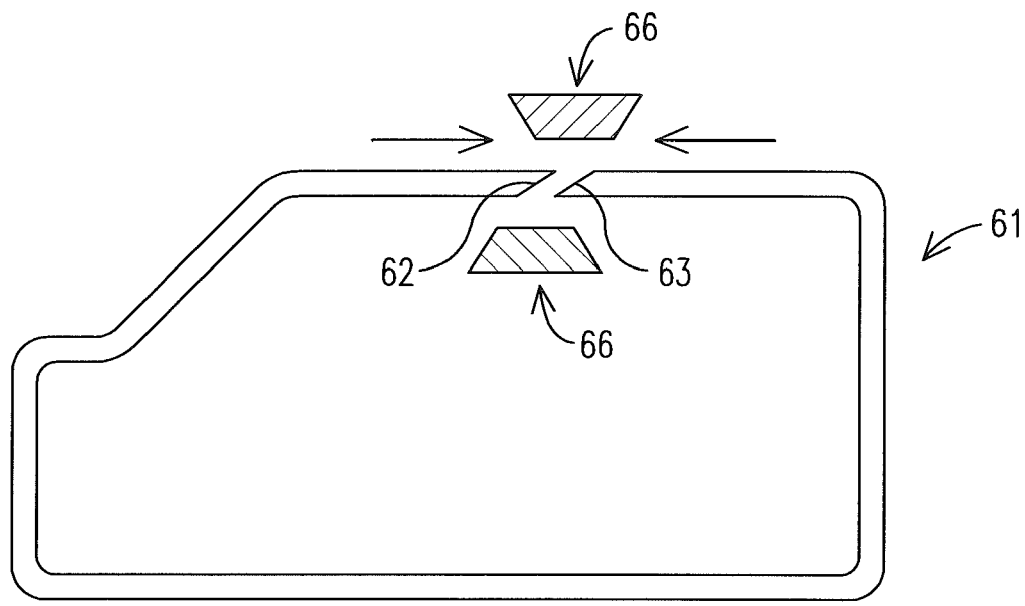
FIG. 5 is a plan view illustrating one technique for bonding cut ends of a press-in-place gasket to form a continuous gasket according to the invention.

Once the gasket shape is completed, the gasket stock is cut at the appropriate place to form a free end. This free end can then be joined to the opposite free end of the formed gasket to complete the continuous press-in-place gasket 61 as illustrated in FIG. 5. Any appropriate technique of joining the free ends 62, 63 can be used including bonding with adhesives, bonding with solvents, bonding with heat or, as in FIG. 5, bonding through sonic welding. In the case of FIG. 5, the free ends 62, 63 may be cut at an angle to increase the surface areas of the ends in contact when brought together. In the illustrated embodiment, an ultrasonic welding head 66 of an ultrasonic welder (not shown) can then apply ultrasonic energy to the ends to weld or fuse the gasket material together. It has been found that welding the jacket material and not joining the ends of the internal metal core helps to compensate for the differences in coefficients of expansion between the two materials when the gasket is in service.

Figure 6:
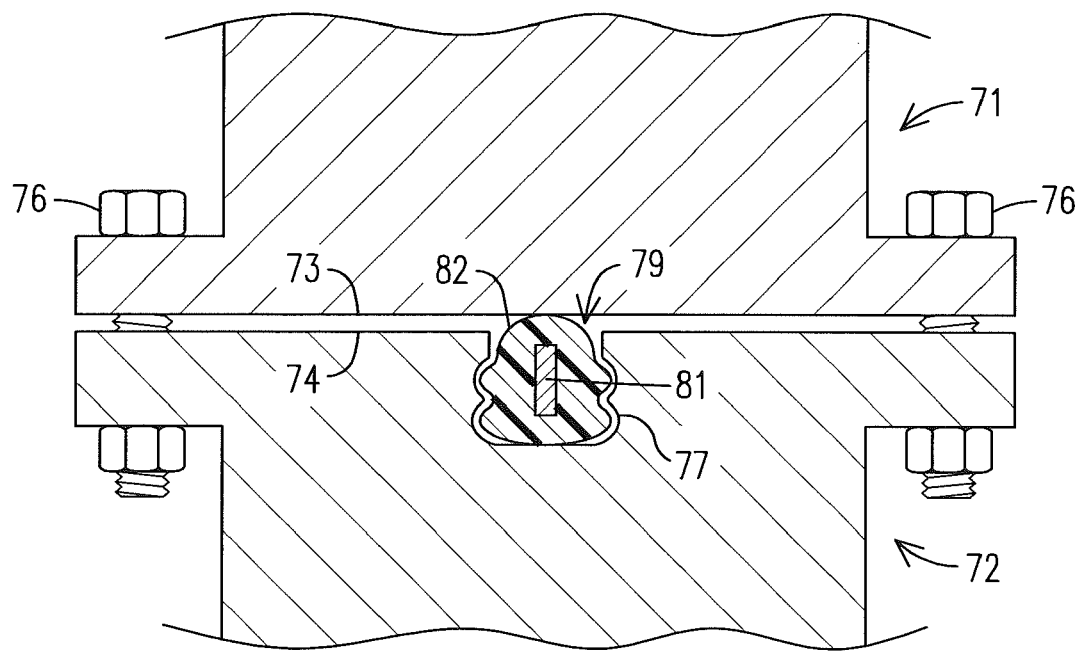
FIG. 6 is a cross sectional view showing a press-in-place gasket according to the invention disposed between a pair of mating surfaces forming a seal therebetween.

Regardless of the bonding technique, the result is a continuous press-in-place gasket that is ready to be pressed into a matching shape groove in a surface to form a seal, as shown in FIG. 6. In this simplified example, part 71 has a surface 73 and part 72 has a mating surface 74. The mating mating surface 74 is formed with a groove 77 having a shape determined by the part designer to seal the region between the two mating surfaces 73 and 74. A press-in-place gasket previously formed by the methodology of the present invention has a shape that matches that of the groove 77. Prior to bolting the parts 71 and 72 together, the press-in-place gasket is pressed into the groove 77 in the mating surface 74 of part 72. The parts 71 and 72 are, in this example, bolted together with bolts 76. As the surface 73 is tightened toward engagement with the mating surface 74, the jacket 82 of the press-in-place gasket 79 is compressed and deformed so that the gasket forms a seal between the two surfaces. The metal core of the press-in-place gasket is sized so that it does not interfere with the compression of the jacket material.

In view of the forgoing discussion, it now will be understood by the skilled artisan that press-in-place gaskets of virtually any shape and configuration can be formed quickly, reliably, and without the need to make injection molds in which to form the gaskets. Test gaskets of various configurations can be made to order and be immediately available to power train designers and others for testing various designs and gasket configurations for a particular purpose. Further, power train designers are now free to make changes in the designs of mating surfaces to be sealed right up until production; and press-in-place gaskets to accommodate these changes can be fabricated and made immediately available to designers at very little cost. This level of flexibility simply has not been available to power train designers and others in the past.

The invention has been described herein in terms of preferred embodiments and methodologies that exemplify the invention and are considered by the inventors to represent the best modes of carrying out the invention. The skilled artisan will understand, however, that a wide gamut of additions, deletions, and substitutions, both subtle and gross, might well be made to the illustrated embodiments without departing from the spirit and scope of the invention, which is determined only by the claims. For example, while the disclosure is particularly applicable to gaskets for power trains of vehicles and other equipment, it may be applied to the formation of gaskets for virtually any press-in-place application. Such gaskets may be useful in the pluming industry, for sealing oil and gas pipeline sections, and many other applications. Thus, the invention is not limited to any particular end application. The particular bending head configuration illustrated herein is an example only and is not limiting. Bending devices of other configurations are within the scope of the invention so long as they meet the requirements detailed above for forming the press-in gasket stock into desired shapes. These and other modifications, both subtle and gross, are possible without departing from the scope of the invention exemplified above.

What is claimed is:

1. A press-in-place gasket for sealing between two opposed surfaces, at least one of the opposed surfaces having a shaped groove formed therein, the gasket comprising:

an elongate core of stiff but bendably deformable material having a cross sectional profile that readily bends and deforms into a bent shape under application of an applied force within a first plane that is co-planar with a length of the core and maintains the bent shape after release of the applied force, and that resists bending within a second plane that is transverse to the first plane;

a jacket encasing the core, the jacket comprising a compressible material configured to form a seal when compressed between the two opposed surfaces, the core and jacket together forming a gasket stock having a free-standing first shape, and that maintains a free-standing second shape after being deformed by bending and releasing the gasket stock within the first plane; and a bonded joint joining the compressible material at free ends of a length of the gasket stock to form a closed press-in-place gasket configured for insertion into the shaped groove in the at least one opposed surface.

2. The press-in-place gasket of claim 1, wherein the length of the gasket stock includes a plurality of shaped bends having angles greater than or about 45 degrees.

3. The press-in-place gasket of claim 2, wherein at least two of the plurality of shaped bends are in opposite directions within the first plane when moving around the gasket is a single direction.

4. The press-in-place gasket of claim 1, wherein the free ends are cut at an acute angle relative to the length of the gasket stock.

5. The press-in-place gasket of claim 1, wherein the first plane and the second plane are substantially perpendicular to each other.

6. The press-in-place gasket of claim 5, wherein the core is rectangular in cross-section with a long axis perpendicular to the first plane.

7. The press-in-place gasket of claim 1, wherein the first plane and the second plane are angularly spaced at about a 45 degree angle to each other.

8. The press-in-place gasket of claim 7, wherein the core is substantially square and bendable in two planes perpendicular to each other.

9. The press-in-place gasket of claim 1, wherein the stiff but bendably deformable material is selected from the group consisting of aluminum, copper, steel, and a shapeable polymer.

10. The press-in-place gasket of claim 1, wherein the compressible material is selected from the group consisting of a thermoset rubber, a polymer, an acrylic, a polyacrylic, and a composite.

11. The press-in-place gasket of claim 1, wherein the gasket stock has a thickness greater than a width.

12. The press-in-place gasket of claim 1, further comprising protrusions of compressible jacket material extending from the sides of the gasket stock and configured to compress and grip the sidewalls of the shaped groove upon insertion therein.

13. A press-in-place gasket for sealing between two opposed surfaces, at least one of the opposed surfaces having a shaped groove formed therein, the press-in-place gasket comprising:
 an elongate strand of gasket stock having a length and ends, the gasket stock comprising:
  a core of stiff but bendably deformable material configured to readily bend and deform into a bent shape under application of an applied force within a first plane that is co-planar with the length of the elongate strand and maintain the bent shape after release of the applied force, and to resist bending within a second plane that is transverse to the first plane; and
  a jacket encasing the core, the jacket comprising a compressible material configured to form a seal when compressed between the two opposed surfaces,
  wherein the gasket stock is configured to maintain a free-standing bent shape after being deformed by bending and releasing the gasket stock within the first plane; and
 the ends of the strand being bondable to each other when the strand is bent into a closed configuration form a press-in-place gasket configured for insertion into the shaped groove in the at least one opposed surface.

14. The press-in-place gasket of claim 13, wherein the free ends are cut at an acute angle relative to the length of the elongate strand.

15. The press-in-place gasket of claim 13, wherein the first plane and the second plane are substantially perpendicular to each other.

16. The press-in-place gasket of claim 15, wherein the core is rectangular in cross-section with a long axis perpendicular to the first plane.

17. The press-in-place gasket of claim 13, wherein the first plane and the second plane are angularly spaced at about a 45 degree angle to each other.

18. The press-in-place gasket of claim 17, wherein the core is substantially square and bendable in two planes perpendicular to each other.

19. The press-in-place gasket of claim 13, wherein the stiff but bendably deformable material is selected from the group consisting of aluminum, copper, steel, and a shapeable polymer.

20. The press-in-place gasket of claim 13, wherein the compressible material is selected from the group consisting of a thermoset rubber, a polymer, an acrylic, a polyacrylic, and a composite.

21. The press-in-place gasket of claim 13, wherein the gasket stock has a thickness greater than a width.

22. The press-in-place gasket of claim 13, further comprising protrusions of compressible jacket material extending from the sides of the gasket stock and configured to compress and grip the sidewalls of the shaped groove upon insertion therein.

23. A method of fabricating a press-in-place gasket for sealing between two opposed surfaces, at least one of the opposed surfaces having a shaped groove formed therein, the method comprising:
 obtaining a linear gasket stock comprising:
  a core of stiff but bendably deformable material configured to readily bend and deform into a bent shape under application of an applied force within a first plane that is co-planar with the length of the gasket stock and maintain the bent shape after release of the applied force, and to resist bending in a second plane that is transverse to the first plane; and
  a jacket encasing the core, the jacket comprising a compressible material configured to form a seal when compressed between the two opposed surfaces,
  wherein the gasket stock is configured to maintain a free-standing bent shape after being deformed by bending and releasing the gasket stock within the first plane;
 advancing the gasket stock to a predetermined position within a bending head aligned with the first plane;
 activating the bending head to form a bend in the gasket stock within the first plane at the predetermined position; and
 repeating the steps of advancing the gasket stock and activating the bending head to form an additional bend in the gasket stock within the first plane until a desired gasket shape configured for insertion into the shaped groove in the at least one opposed surface is obtained.

24. The method of claim 23 and further comprising:
 cutting the gasket stock to form free ends; and
 bonding the free ends together to form a closed press-in-place gasket.

25. The method of claim 23 and further comprising:
 advancing the gasket stock to a predetermined position within a bending head aligned with a second plane that is perpendicular to the first plane;
 activating the additional bending head to form a bend in the gasket stock within the second plane.

* * * * *